United States Patent
Chen et al.

(10) Patent No.: US 10,802,170 B2
(45) Date of Patent: Oct. 13, 2020

(54) METHOD FOR CHARACTERIZING GAS-BEARING RESERVOIR BASED ON LOGGING CONSTRAINT

(71) Applicant: Chengdu University of Technology, Chengdu, Sichuan (CN)

(72) Inventors: Xuehua Chen, Sichuan (CN); Jie Zhang, Sichuan (CN); Xin Luo, Sichuan (CN); Wei Jiang, Sichuan (CN); Chen Zhou, Sichuan (CN); Wei Xiang, Sichuan (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 16/690,050

(22) Filed: Nov. 20, 2019

(65) Prior Publication Data
US 2020/0158900 A1    May 21, 2020

(51) Int. Cl.
*G01V 1/30*    (2006.01)

(52) U.S. Cl.
CPC .............. *G01V 1/306* (2013.01); *G01V 1/307* (2013.01); *G01V 2210/6161* (2013.01); *G01V 2210/6169* (2013.01); *G01V 2210/624* (2013.01); *G01V 2210/63* (2013.01)

(58) Field of Classification Search
CPC .. G01V 1/306; G01V 1/307; G01V 2210/624; G01V 2210/63; G01V 2210/6161; G01V 2210/6169
See application file for complete search history.

(56) References Cited

U.S. PATENT DOCUMENTS

| | | | | |
|---|---|---|---|---|
| 5,798,982 A | * | 8/1998 | He | G01V 1/306 367/28 |
| 9,291,736 B2 | * | 3/2016 | Le Meur | G01V 1/366 |
| 9,405,026 B2 | * | 8/2016 | Toms | G01V 1/306 |
| 9,664,039 B2 | * | 5/2017 | Neale | G01V 1/288 |
| 10,101,495 B2 | * | 10/2018 | Li | G01V 11/007 |
| 10,386,513 B2 | * | 8/2019 | Aarre | G01V 1/003 |
| 10,519,769 B2 | * | 12/2019 | Havens | E21B 49/006 |
| 10,544,673 B2 | * | 1/2020 | Lakings | E21B 47/026 |
| 2002/0185329 A1 | * | 12/2002 | Goloshubin | G01V 1/306 181/111 |
| 2004/0064257 A1 | * | 4/2004 | Tobias | G01V 1/306 702/6 |

(Continued)

FOREIGN PATENT DOCUMENTS

| CN | 101906966 A | 12/2010 |
|---|---|---|
| CN | 104155693 A | 11/2014 |

(Continued)

*Primary Examiner* — Mohammad K Islam
(74) *Attorney, Agent, or Firm* — Wayne & Ken, LLC; Tony Hom

(57) ABSTRACT

The invention relates to petroleum seismic exploration, and more specifically to a method for gas-bearing reservoir characterization using logging information. In the method, logging information is used as a constraint to indirectly characterize the distribution range of the gas-bearing reservoir by determining the upper and lower boundaries. In addition, this method enables the automatic determination of the optimal calculation parameters according to the characteristics of input data, allowing for more accurate results.

3 Claims, 5 Drawing Sheets

(56) References Cited

U.S. PATENT DOCUMENTS

| | | | |
|---|---|---|---|
| 2005/0043892 A1* | 2/2005 | Lichman | G01V 1/306 702/13 |
| 2005/0086005 A1* | 4/2005 | Taner | G01V 1/306 702/14 |
| 2009/0175126 A1* | 7/2009 | Lambert | G01V 1/32 367/59 |
| 2010/0027377 A1* | 2/2010 | Zuercher | G01V 1/306 367/73 |
| 2010/0036614 A1* | 2/2010 | Zuercher | G01V 1/288 702/16 |
| 2010/0284247 A1* | 11/2010 | Manning | G01V 1/288 367/28 |
| 2012/0257476 A1* | 10/2012 | Muhl | G01V 1/325 367/38 |
| 2013/0146282 A1* | 6/2013 | Toms | G01V 1/306 166/250.03 |
| 2013/0176820 A1* | 7/2013 | Le Meur | G01V 1/366 367/38 |
| 2013/0261982 A1* | 10/2013 | Zhang | G01V 1/008 702/15 |
| 2015/0073715 A1* | 3/2015 | Aarre | G01V 1/345 702/14 |
| 2015/0226868 A1* | 8/2015 | Cieplicki | G01V 1/307 702/14 |
| 2016/0178772 A1* | 6/2016 | Carter | G01V 1/282 702/17 |
| 2017/0115411 A1* | 4/2017 | Zhang | G01V 1/282 |
| 2017/0261642 A1* | 9/2017 | Li | G01V 11/007 |
| 2017/0275989 A1* | 9/2017 | Lakings | E21B 43/26 |
| 2018/0088249 A1* | 3/2018 | Aarre | G01V 1/30 |
| 2018/0100938 A1* | 4/2018 | Adamopoulos | E21B 47/107 |
| 2018/0106147 A1* | 4/2018 | Lakings | E21B 49/003 |
| 2018/0292552 A1* | 10/2018 | Ramsay | G01V 1/50 |
| 2019/0094397 A1* | 3/2019 | Zhang | G01V 1/42 |
| 2019/0113639 A1* | 4/2019 | Khadhraoui | G01V 1/50 |
| 2019/0265376 A1* | 8/2019 | Natu | G01V 1/307 |
| 2019/0277993 A1* | 9/2019 | Chen | G01V 1/50 |
| 2019/0324167 A1* | 10/2019 | Zhang | G06F 17/18 |
| 2019/0383965 A1* | 12/2019 | Salman | G01V 99/005 |
| 2020/0025963 A1* | 1/2020 | Ghahfarokhi | G01V 1/226 |

FOREIGN PATENT DOCUMENTS

| | | |
|---|---|---|
| CN | 106707338 A | 5/2017 |
| CN | 108020863 A | 5/2018 |
| EP | 3217192 A1 | 9/2017 |
| WO | 2015034539 A1 | 3/2015 |

* cited by examiner

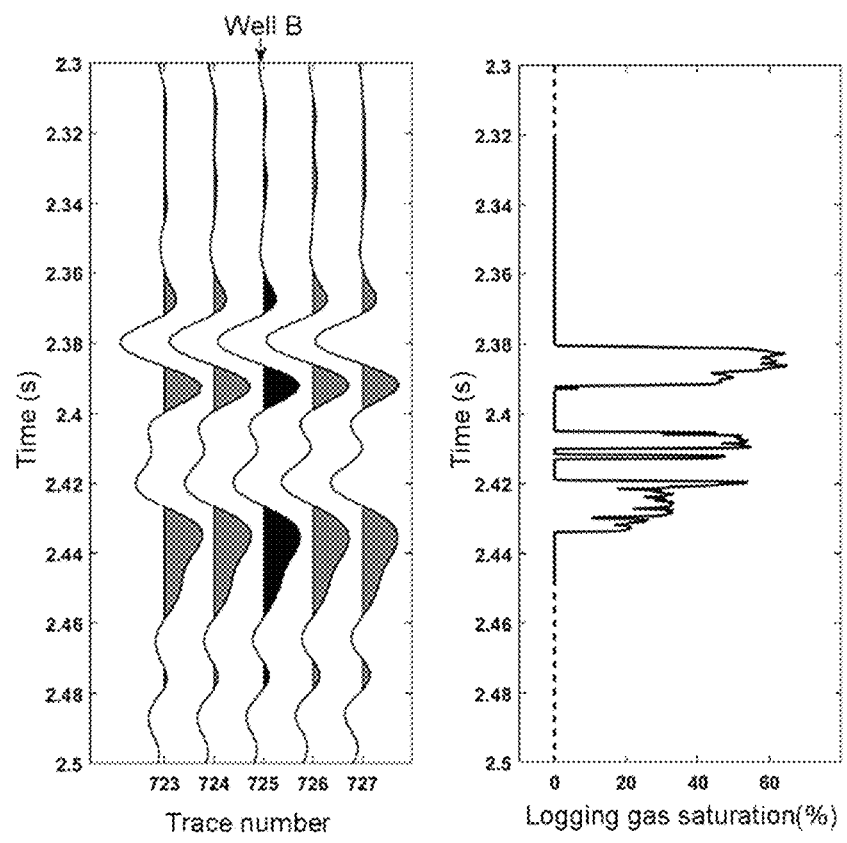
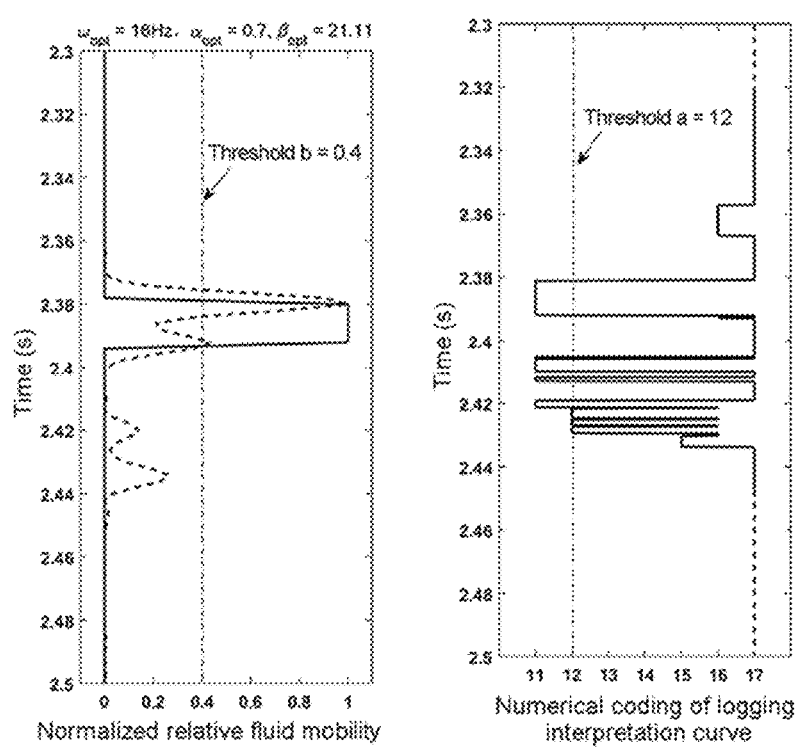
FIG. 4A  FIG. 4B
FIG. 4C  FIG. 4D

METHOD FOR CHARACTERIZING GAS-BEARING RESERVOIR BASED ON LOGGING CONSTRAINT

CROSS-REFERENCE TO RELATED APPLICATIONS

This application claims the benefit of priority from Chinese Patent Application No. 201811388601.9, filed on Nov. 21, 2018. The content of the aforementioned application, including any intervening amendments thereto, is incorporated herein by reference in its entirety.

TECHNICAL FIELD

The present invention relates to petroleum seismic exploration, and more particularly to a method for gas-bearing reservoir characterization based on logging constraint.

BACKGROUND

In recent years, the exploration for natural gas in China has mainly focused on offshore deep-water oil-gas reservoir; however, since the deep-water oil-gas reservoir is usually susceptible to structure and reservoir heterogeneity, it often has complicated geological conditions, resulting in great difficulties in identification. As recorded in seismic data, the top interface of a gas-bearing reservoir usually shows strong negative reflection, which may be actually caused by other factors such as the tuning thickness of a formation. Therefore, how to use the seismic data to perform the gas-bearing reservoir prediction, especially a high gas saturation reservoir, to reduce the prediction multiplicity, improve the prediction accuracy and reduce the risks of exploration and development, has always been one of the important research contents in the geophysical exploration.

At present, it has been demonstrated by petrophysics experiments that a saturated fluid-containing pore medium reservoir may cause low-frequency large amplitudes and phase delay at a reflection event, so that these features may facilitate the identification of the abnormity of the saturated fluid-containing reservoir in low-frequency energy. Therefore, the low-frequency information in the seismic data is of great significance to the exploration of the gas-bearing reservoir. Since the viscosity of a multiphase saturated fluid is directly determined by gas saturation or oil saturation, the viscosity contained in the fluid mobility parameters of the reservoir fluid may be used to reflect the gas saturation or the oil saturation. Meanwhile, the low-frequency seismic reflection coefficient is a function of the fluid mobility (defined as a ratio of the permeability of the reservoir to the viscosity coefficient of the fluid), which enables that there is a relationship established between the low-frequency information of seismic reflection and the fluid mobility of the reservoir fluid. Therefore, it is feasible to apply the sensitive frequency band of seismic data to invert the fluid mobility of the reservoir fluid to perform the gas-bearing reservoir prediction, especially a high gas saturation reservoir. Chen et al. (2012) proposed a method for calculating the fluid mobility of reservoir fluid using low-frequency seismic information, and this method obtains excellent results in applications of 3D offshore and onshore seismic data process.

However, in some offshore deep-water exploration areas, especially for the anomalous surpressure reservoirs, the fluid mobility of the reservoir fluid calculated according to the low-frequency seismic information is not correlated well with the gas saturation indicated by logging. In addition, some important parameters in the above method are required to be selected based on the experience of a geophysicist or by a trial-and-error method, which has certain subjectivity, affecting the detection for the gas-bearing reservoir.

SUMMARY

This invention provides a method for gas-bearing reservoir characterization based on logging constraint to overcome the difficulties in the seismic detection for gas-bearing reservoirs.

The invention provides a method for gas-bearing reservoir characterization based on logging constraint, including:

(1) inputting a seismic record of a 3D seismic data set, and smoothing two ends of the seismic record to obtain the smoothed seismic record $x(t)$;

(2) substituting the smoothed seismic record $x(t)$ to the following formula to obtain the optimal fluid mobility interface curve FB:

$$FB = \left[\frac{\partial SP_{opt}}{\partial \omega_{opt}}\right]^2;$$

where $\omega_{opt}$ is optimal frequency parameter, and $SP_{opt}$ is energy of optimal instantaneous amplitude spectrum; $SP_{opt}$ is calculated according to the following formula:

$$SP_{opt} = [\text{real}(S_{opt})]^2 + [\text{imag}(S_{opt})]^2;$$

where $S_{opt}$ is optimal instantaneous amplitude spectrum; real(g) represents the real part of $S_{opt}$, imag(g) represents the imaginary part of $S_{opt}$;

$S_{opt}$ is calculated according to the following formula:

$$S_{opt} = ift\left[X \times \exp\left(\frac{2\pi^2 f^2}{\alpha_{opt}^2 \omega_{opt}^{2\beta_{opt}}}\right)\right];$$

where X is derived from Fourier transform of $x(t)$; f is a vector constructed by the index numbers of sampling points; $\alpha_{opt}$ and $\beta_{opt}$ are optimal adjustment parameters, ift(g) represents the inverse Fourier transform;

based on a one-dimension vector $\omega=[4,5,L,\omega_u]$, where $\omega_u$, is an upper limit frequency; and a one-dimension vector $\alpha=[0.5, 0.6, L, 1.5]$; and setting the subscripts of the elements in the vector $\alpha$ to be i=1, 2,L,11, optimal parameters $\omega_{opt}$, $\alpha_{opt}$ and $\beta_{opt}$ are determined according to the following steps:

a) for $\alpha(i)$, setting the subscripts of the elements in the vector $\omega$ to be j=1, 2,L, n, and establishing the following objective function for each element $\omega(j)$ of $\omega$:

$$T(\alpha(i),\omega(j))=-(f_1+f_2);$$

where $\eta_1 = \text{sum}(fb_n)$, $\eta_2 = \text{sum}(-g)$, sum(g) represents a summation operation;

finding out β, which maximizes the value of objective function $T(\alpha(i), \omega(j))$, by using a one-dimension grid search method; storing β into β(j) of a one-dimensional vector β, and storing the corresponding value of the objective function into T(j) of a one-dimension vector T;

b) finding out the maximum value T(maxid) of T, and finding out the corresponding ω(maxid) and β(maxid) at the location of subscript (maxid); and storing T(maxid), ω(maxid), α(i) and β(maxid) into the i-th row of a two-dimension vector Ω with eleven rows and four columns;

c) setting i=i+1, if i>12, performing step d), otherwise repeating step a) and step b) again;

d) finding out the maximum value in the first column of $\Omega$, and the last three values in the row corresponding to the subscript of the maximum value are the optimal frequency parameter $\omega_{opt}$ and the optimal adjustment parameters $\alpha_{opt}$ and $\beta_{opt}$, respectively;

in the objective function, $fb_n$ is the normalization of the fluid mobility interface curve fb, and fb is calculated according to the following formula:

$$fb = \left[\frac{\partial SP}{\partial \omega(i)}\right]^2;$$

where SP is energy of instantaneous amplitude spectrum, which is calculated according to the following formula:

$$SP=[real(S)]^2+[imag(S)]^2;$$

where S is instantaneous amplitude spectrum, which is calculated according to the following formula:

$$S = ift\left[X \times \exp\left(-\frac{2\pi^2 f^2}{\alpha(i)\omega(j)^{2\beta}}\right)\right];$$

in the objective function, g is calculated as follow:

$$g=fb_n \mathbin{g} I_G;$$

where the symbol g represents the Hadamard product operation;

a threshold a is determined according to characteristics of input seismic data and logging information, and $I_G$ is calculated as the following formula:

$$\begin{cases} I_G(I_G < a) = 0 \\ I_G(I_G \geq a) = 1 \end{cases} \text{ or } \begin{cases} I_G(I_G \leq a) = 1 \\ I_G(I_G > a) = 0 \end{cases}$$

(3) normalizing the optimal fluid mobility interface curve FB to obtain $FB_n$, and standardizing x(t) to obtain $x_z(t)$;

(4) determining an upper boundary point set and a lower boundary point set of the gas-bearing reservoir according to extrema on the curve $x_z(t)$ and $FB_n$, and then determining indication results of the gas-bearing reservoir by using the upper boundary point set and the lower boundary point set according to the following steps:

a) determining other threshold b according to the information about gas saturation in the logging information, picking up extrema bigger than the threshold b on the curve $FB_n$, and the corresponding index numbers of these extrema on the curve $FB_n$ form a contrast point set CP;

b) standardizing the x(t) to obtain $x_z(t)$, and picking up extrema on the $x_z(t)$, and the corresponding index numbers of these extrema on the curve $x_z(t)$ form an information point set I;

c) matching the information point set I with the contrast point set CP to form the candidate point set CA;

d) selecting the maximum point on the curve $FB_n$, finding out a point corresponding to the index number of the maximum point from the candidate point set CA and taking the point as a reference point, taking the reference point as a boundary to divide CA into an upper candidate point set $CA_L$ and a lower candidate point set $CA_B$, sorting points in the upper candidate point set $CA_L$ in descending order, and sorting points in the lower candidate point set $CA_B$ in ascending order;

e) for the point in the upper candidate point set $CA_L$ and the lower candidate point set $CA_B$, if its corresponding value in $x_z(t)$ is smaller than the average of $x_z(t)$, putting the point into the upper boundary point set UB; otherwise if its corresponding value in $x_z(t)$ equal or bigger than the average of $x_z(t)$, putting the point into the lower boundary point set LB; finally, there is an one-to-one match between the upper boundary point set UB and the lower boundary point set LB;

f) calculating the normalized gas-bearing reservoir indication GI of the input seismic record according to the following formula:

$$GI(j) = \begin{cases} 1, & UB(i) \leq j \leq LB(i) \\ 0, & \text{others} \end{cases};$$

where j is the subscript of an element in GI, and i is the subscript of an element in UB and LB;

g) performing inverse proportional transformation on GI to obtain the gas-bearing reservoir indication result of the input seismic record;

(5) repeating steps (1) to (4) until all the seismic records in the input 3D seismic data set are completely processed to obtain the gas-bearing reservoir indication results of the whole 3D seismic data set.

a plurality of wells are used as constraints to obtain a plurality of sets of the optimal frequency parameters $\omega_{opt}$, and the optimal adjustment parameters $\alpha_{opt}$ and $\beta_{opt}$, each set of the optimal parameters is used to calculate the gas-bearing reservoir indication results of the input seismic data set, and the respective calculation results are superimposed to obtain a more accurate result.

BRIEF DESCRIPTION OF THE DRAWINGS

FIG. 2A shows five seismic traces nearby well A, where a borehole-side trace of well A is marked by arrow, the abscissa indicates trace number, the ordinate indicates time(s);

FIG. 2B shows a logging gas saturation curve, where the abscissa indicates logging gas saturation (%), the ordinate indicates time(s);

FIG. 2C shows a normalized high gas saturation reservoir indication result (solid line) and the optimal fluid mobility interface curve (dash line), where the ordinate indicates time(s);

FIG. 2D shows a logging interpretation curve, where the abscissa indicates the numerical codes, the ordinate indicates time(s);

FIGS. 4A-4D show the comparison between a normalized high gas saturation reservoir indication result and the logging information of well B;

FIG. 4A shows five seismic traces near well B, where a borehole-side trace of well B is marked by an arrow, the abscissa indicates trace number; the ordinate indicates time(s);

FIG. 4B shows a logging gas saturation curve, where the abscissa indicates logging gas saturation (%), the ordinate indicates time(s);

FIG. 4C shows a normalized high gas saturation reservoir indication result (solid line) and the optimal fluid mobility interface curve (broken line), where the ordinate indicates time(s);

FIG. 4D shows a logging interpretation curve, where the abscissa indicates numerical code, the ordinate indicates time(s);

DETAILED DESCRIPTION OF EMBODIMENTS

Figure 1:
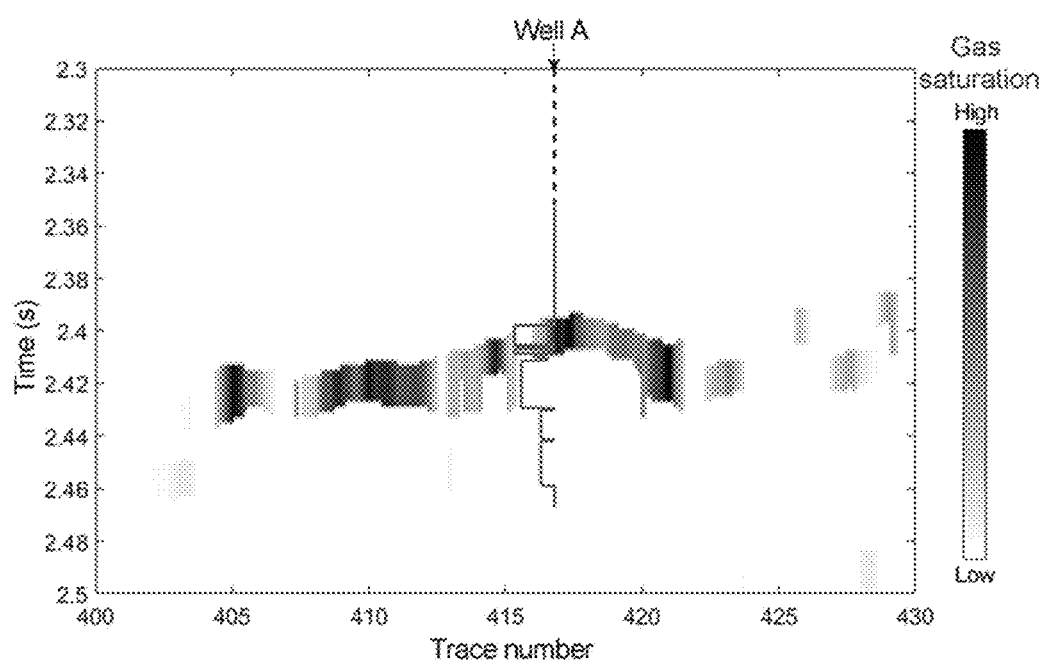
FIG. 1 is a section passing through well A of high gas saturation reservoir indication result in the target area according to an embodiment of the invention; where the abscissa indicates trace number; and the ordinate indicates time in second (i.e. s)

The method for gas-bearing reservoir characterization based on logging constraint according to the present application is now described below.

(1) inputting a seismic record of a 3D seismic data set, and smoothing two ends of the seismic record to obtain the smoothed seismic record $x(t)$;

(2) substituting the smoothed seismic record $x(t)$ to the following formula to obtain the optimal fluid mobility interface curve FB:

$$FB = \left[\frac{\partial SP_{opt}}{\partial \omega_{opt}}\right]^2;$$

where $\omega_{opt}$ is optimal frequency parameter, and $SP_{opt}$ is energy of optimal instantaneous amplitude spectrum; $SP_{opt}$ is calculated according to the following formula:

$$SP_{opt} = [\text{real}(S_{opt})]^2 + [\text{imag}(S_{opt})]^2;$$

where $S_{opt}$ is optimal instantaneous amplitude spectrum; real(g) represents the real part of $S_{opt}$, imag(g) represents the imaginary part of $S_{opt}$;

$S_{opt}$ is calculated according to the following formula:

$$S_{opt} = ift\left[X \times \exp\left(-\frac{2\pi^2 f^2}{\alpha_{opt}^2 \omega_{opt}^{2\beta_{opt}}}\right)\right];$$

where X is derived from Fourier transform of $x(t)$; f is a vector constructed by the index numbers of sampling points; $\alpha_{opt}$ and $\beta_{opt}$ are optimal adjustment parameters, ift(g) represents the inverse Fourier transform;

based on a one-dimension vector $\omega=[4, 5, L, \omega_u]$, where $\omega_u$ is an upper limit frequency; and a one-dimension vector $\alpha=[0.5, 0.6, L, 1.5]$; and setting the subscripts of the elements in the vector $\alpha$ to be i=1,2,L,11, optimal parameters $\omega_{opt}$, $\alpha_{opt}$ and $\beta_{opt}$ are determined according to the following steps:

a) for $\alpha(i)$, setting the subscripts of the elements in the vector $\omega$ to be j=1, 2,L,n, and establishing the following objective function for each element $\omega(j)$ of $\omega$:

$$T(\alpha(i),\omega(j))=-(f_1+f_2)$$

where $f_1=\text{sum}(fb_n)$, $f_2=\text{sum}(-g)$, sum(g) represents a summation operation;

finding out β, which maximizes the value of objective function $T(\alpha(i), \omega(j))$, by using a one-dimension grid search method; storing β into β(j) of a one-dimensional vector β, and storing the corresponding value of the objective function into T(j) of a one-dimension vector T;

b) finding out the maximum value T(maxid) of T, and finding out the corresponding ω(maxid) and ⊕(maxid) at the location of subscript (maxid); and storing T(maxid), ω(maxid), α(i) and β(maxid) into the i-th row of a two-dimension vector Ω with eleven rows and four columns;

c) setting i=i+1, if i>12, performing step d), otherwise repeating step a) and step b) again;

d) finding out the maximum value in the first column of Ω, and the last three values in the row corresponding to the subscript of the maximum value are the optimal frequency parameter $\omega_{opt}$ and the optimal adjustment parameters $\alpha_{opt}$ and $\beta_{opt}$, respectively;

in the objective function, $fb_n$ is the normalization of the fluid mobility interface curve fb, and fb is calculated according to the following formula:

$$fb = \left[\frac{\partial SP}{\partial \omega(i)}\right]^2;$$

where SP is energy of instantaneous amplitude spectrum, which is calculated according to the following formula:

$$SP=[\text{real}(S)]^2+[\text{imag}(S)]^2;$$

where S is instantaneous amplitude spectrum, which is calculated according to the following formula:

$$S_{opt} = ift\left[X \times \exp\left(-\frac{2\pi^2 f^2}{\alpha(i)\omega(j)^{2\beta}}\right)\right];$$

in the objective function, g is calculated as follow:

$$g=fb_n gI_G;$$

where the symbol g represents the Hadamard product operation;

a threshold a is determined according to characteristics of input seismic data and logging information, and $I_G$ is calculated as the following formula:

$$\begin{cases} I_G(I_G < a) = 0 \\ I_G(I_G \geq a) = 1 \end{cases} \text{ or } \begin{cases} I_G(I_G \leq a) = 1 \\ I_G(I_G > a) = 0 \end{cases}$$

(3) normalizing the optimal fluid mobility interface curve FB to obtain $FB_n$, and standardizing $x(t)$ to obtain $x_z(t)$;

(4) determining an upper boundary point set and a lower boundary point set of the gas-bearing reservoir according to extrema on the curve $x_z(t)$ and $FB_n$, and then determining indication results of the gas-bearing reservoir by using the upper boundary point set and the lower boundary point set according to the following steps:

a) determining other threshold b according to the information about gas saturation in the logging information, picking up extrema bigger than the threshold b on the curve $FB_n$, and the corresponding index numbers of these extrema on the curve $FB_n$ form a contrast point set CP;

b) standardizing the x(t) to obtain $x_z(t)$, and picking up extrema on the $x_z(t)$, and the corresponding index numbers of these extrema on the curve $x_z(t)$ form an information point set I;

c) matching the information point set I with the contrast point set CP to form the candidate point set CA;

d) selecting the maximum point on the curve $FB_n$, finding out a point corresponding to the index number of the maximum point from the candidate point set CA and taking the point as a reference point, taking the reference point as a boundary to divide CA into an upper candidate point set $CA_L$ and a lower candidate point set $CA_B$, sorting points in the upper candidate point set $CA_L$ in descending order, and sorting points in the lower candidate point set $CA_B$ in ascending order;

e) for the point in the upper candidate point set $CA_L$ and the lower candidate point set $CA_B$, if its corresponding value in $x_z(t)$ is smaller than the average of $x_z(t)$, putting the point into the upper boundary point set UB; otherwise if its corresponding value in $x_z(t)$ equal or bigger than the average of $x_z(t)$, putting the point into the lower boundary point set LB; finally, there is an one-to-one match between the upper boundary point set UB and the lower boundary point set LB;

f) calculating the normalized gas-bearing reservoir indication GI of the input seismic record according to the following formula:

$$GI(j) = \begin{cases} 1, & UB(i) \le j \le LB(i) \\ 0, & others \end{cases};$$

where j is the subscript of an element in GI, and i is the subscript of an element in UB and LB;

g) performing inverse proportional transformation on GI to obtain the gas-bearing reservoir indication result of the input seismic record;

(5) repeating steps (1) to (4) until all the seismic records in the input 3D seismic data set are completely processed to obtain the gas-bearing reservoir indication results of the whole 3D seismic data set.

a plurality of wells are used as constraints to obtain a plurality of sets of the optimal frequency parameters $\omega_{opt}$, and the optimal adjustment parameters $\alpha_{opt}$ and $\beta_{opt}$, each set of the optimal parameters is used to calculate the gas-bearing reservoir indication results of the input seismic data set, and the respective calculation results are superimposed to obtain a more accurate result.

FIG. 1 is a section passing through well A of high gas saturation reservoir indication result in the target area according to an embodiment of the invention, while there are the optimal frequency $\omega_{opt}$=16 Hz, and the optimal adjusting parameters $\alpha_{opt}$=0.7 and $\beta_{opt}$=21.11. In this case, the logging gas saturation and the interpretation of well A are used as constraints to obtain the optimal parameters $\omega_{opt}$, $\alpha_{opt}$ and $\beta_{opt}$. In the target area, the main object is to find out the distribution range of subsurface high gas saturation reservoirs. Although low gas saturation reservoirs contain gas, they are not profitable for the hydrocarbon exploration in deep water.

FIGS. 2A-D shows the comparison between the normalized indication result of the high gas saturation reservoir and the logging information at well A, while there are the optimal frequency $\omega_{opt}$=16 Hz, the optimal adjusting parameters $\alpha_{opt}$=0.7 and $\beta_{opt}$=21.11. In the logging interpretation curve of this area, the numerical code of the high gas saturation reservoir is defined as 11 and the numerical code of the low gas saturation reservoir is defined as 12. The upper limit frequency $\omega_u$ in step (2) of the embodiment is set to 100 Hz. According to the logging interpretation curve, the threshold a is set to 12, and $I_G$ is calculated according to $$\begin{cases} I_G(I_G \le a) = 1 \\ I_G(I_G > a) = 0 \end{cases}.$$

Figures 2A, 2B:
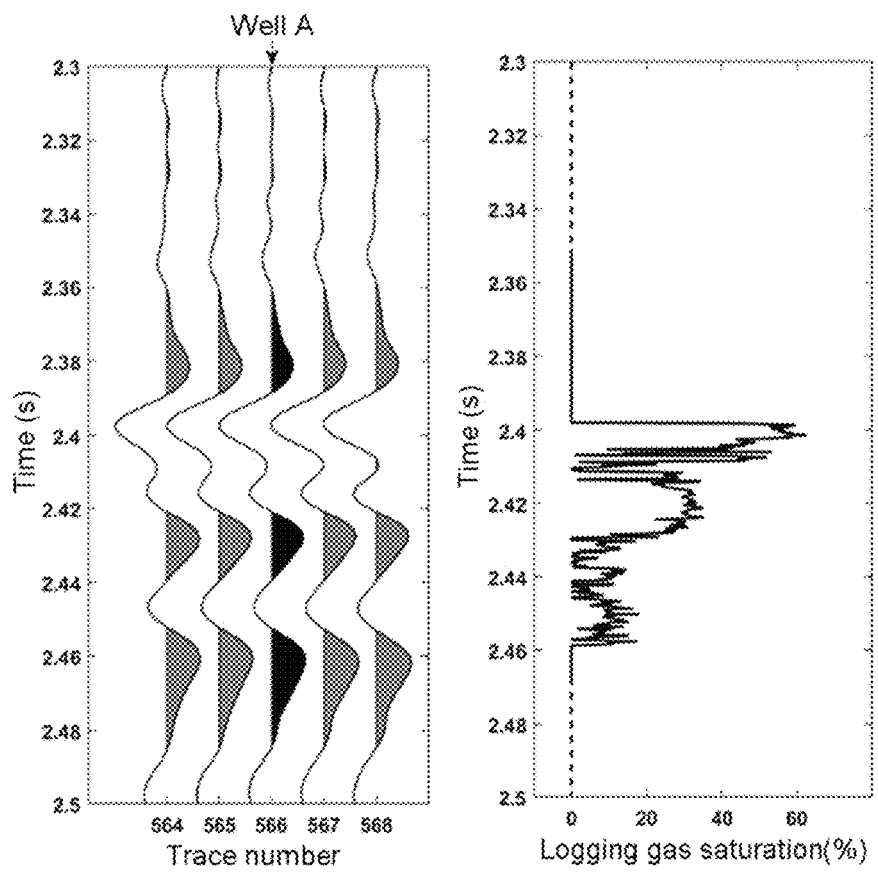
FIGS. 2A-2D show the comparison between the normalized high gas saturation reservoir indication result and the logging information of well A.
Figures 2C, 2D:
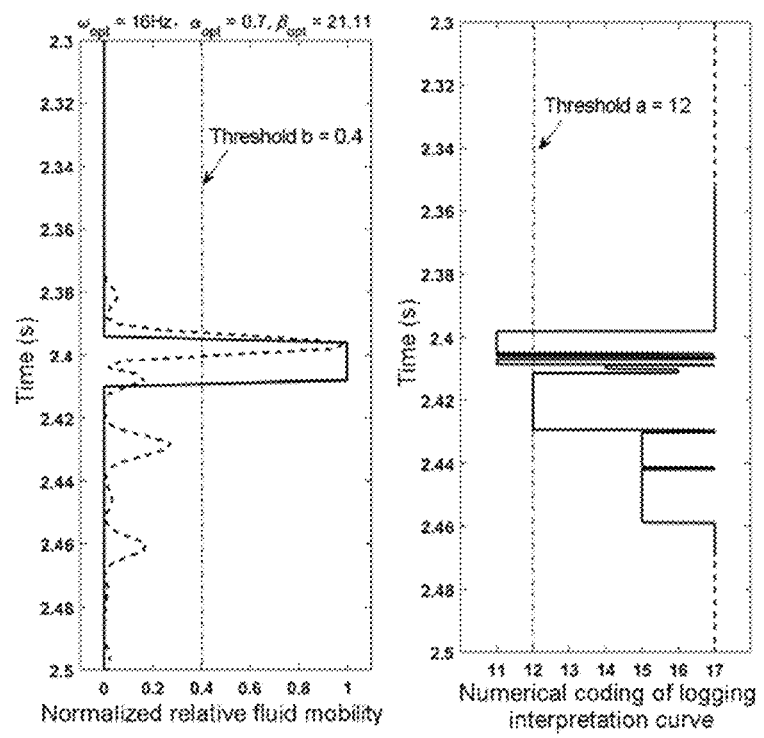

The threshold b in step (6) of this embodiment is set to 0.4. It can be seen in the FIG. 2 that the normalized indication result (the solid line in FIG. 2C) of high gas saturation reservoir is highly consistent with the logging gas saturation curve (FIG. 2B) and the logging interpretation curve (FIG. 2D).

Figure 3:
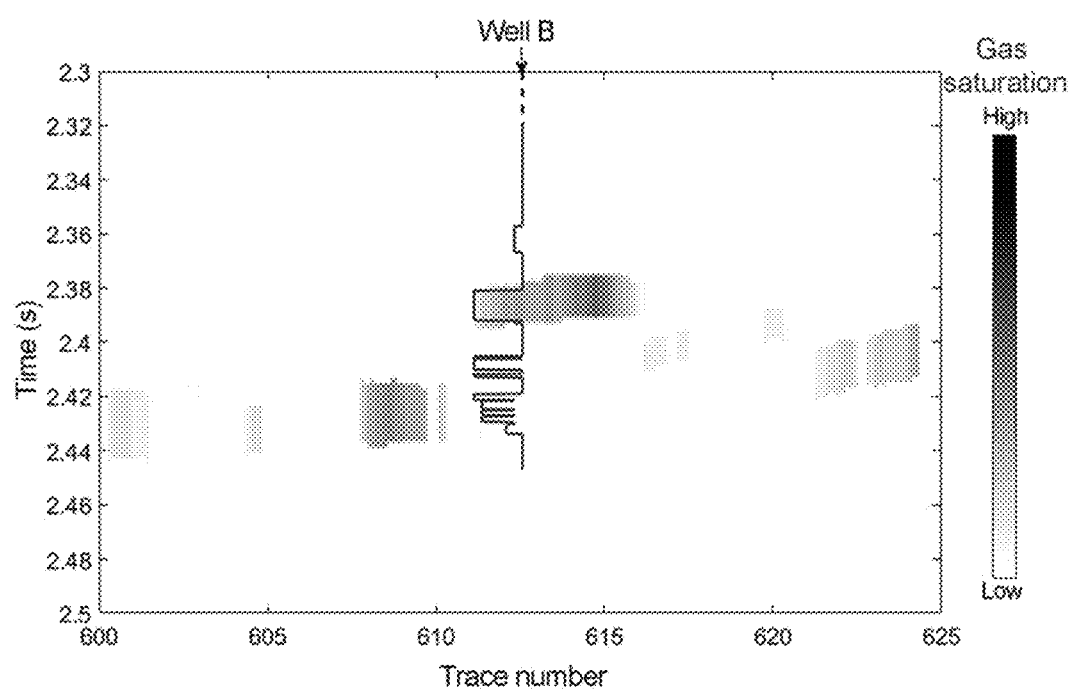
FIG. 3 is another section passing through well B of high gas saturation reservoir indication result in the same target area according to an embodiment of the invention; where the abscissa indicates trace number; the ordinate indicates time(s)

FIG. 3 is another section passing through well B of the indication result of high gas saturation reservoir according to an embodiment of the invention, while there are optimal frequency $\omega_{opt}$=16 Hz and the optimal adjusting parameters $\alpha_{opt}$=0.7 and $\beta_{opt}$=21.11. In this case, the logging gas saturation and the interpretation of well A are used as constraints to obtain the optimal parameters $\omega_{opt}$, $\alpha_{opt}$ and $\beta_{opt}$. Well B is used as a reference.

FIGS. 4A-D shows the comparison between the normalized indication result of high gas saturation reservoir and the logging information at well B, while there are optimal frequency $\omega_{opt}$=16 Hz, optimal adjusting parameters $\alpha_{opt}$=0.7 and $\beta_{opt}$=21.11. It also can be seen that the normalized indication result (the solid line in FIG. 4C) of high gas saturation reservoir is highly consistent with both the logging gas saturation curve (FIG. 4B) and the logging interpretation curve (FIG. 4D) Thus, the result verifies the accuracy of the invention for the prediction of the distribution range of high gas saturation reservoirs.

Figure 5:
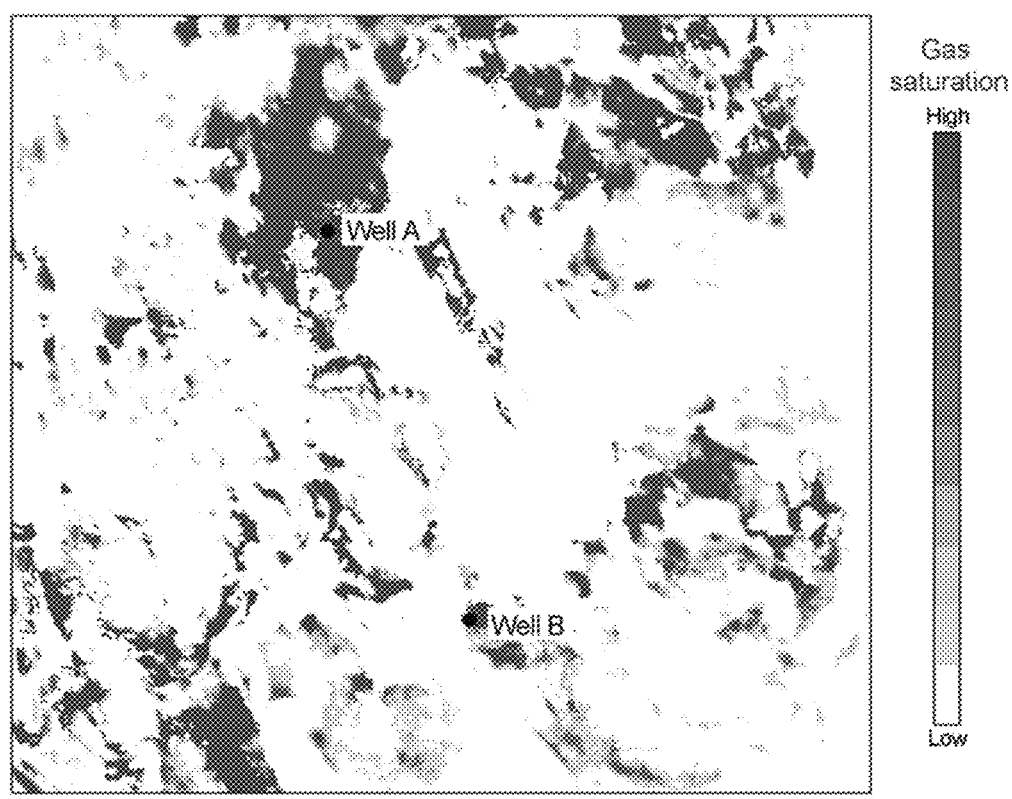
FIG. 5 is a horizontal slice extracted at the target interval, which shows a 3D high-gas saturation reservoir indication result in the target area.

FIG. 5 is a horizontal slice extracted at the target interval, which shows a 3D high-gas saturation reservoir indication result in the target area. It can be seen that well A and well B are both located in high gas saturation zones. More importantly, in undrilling zones, the slice may provide reference for determining new drilling locations for profitable wells.

The advantages of the invention are described as follows. 1) The logging information is used as constraints, so that the optimal frequency $\omega_{opt}$ and the optimal adjustment parameters $\alpha_{opt}$ and $\beta_{pt}$ can be automatically determined according to the characteristics of the input data. Thus it does not need to manually adjust the parameters. 2) The distribution range of the gas-bearing reservoirs is indirectly obtained by determining the upper and lower boundaries of the gas-bearing reservoirs, which contributes to a more accurate result. 3) The invention has a high computational efficiency, and thus it can be applied to the large-scale 3D seismic data set.

The above embodiments are merely illustrative of the invention, and various variations can be made to the steps in the above embodiments. Any equivalent changes and improvements made without departing from the spirit of the invention should fall within the scope of the invention.

What is claimed is:

1. A method for gas-bearing reservoir characterization based on logging constraint, comprising:

(1) inputting a seismic record of a 3D seismic data set, and smoothing two ends of the seismic record to obtain a smoothed seismic record x(t);

(2) substituting the smoothed seismic record x(t) to $$FB = \left[\frac{\partial SP_{opt}}{\partial \omega_{opt}}\right]^2;$$

to obtain an optimal fluid mobility interface curve FB;
wherein $\omega_{opt}$ is optimal frequency parameter, and $SP_{opt}$ is energy of optimal instantaneous amplitude spectrum;
calculating $SP_{opt}$ according to $$SP_{opt} = [\text{real}(S_{opt})]^2 + [\text{imag}(S_{opt})]^2;$$

wherein $S_{opt}$ is optimal instantaneous amplitude spectrum; real(g) represents the real part of $S_{opt}$, imag(g) represents the imaginary part of $S_{opt}$;
calculating $S_{opt}$ according to $$S_{opt} = ift\left[X \times \exp\left(-\frac{2\pi^2 f^2}{\alpha_{opt}^2 \omega_{opt}^{2\beta_{opt}}}\right)\right];$$

wherein X is derived from a Fourier transform of x(t); f is a vector constructed by index numbers of sampling points; $\alpha_{opt}$ and $\beta_{opt}$ are optimal adjustment parameters, ift(g) represents an inverse Fourier transform;
setting a one-dimension vector $\omega = [4, 5, L, \omega_u]$, wherein $\omega_u$ is an upper limit frequency; setting a one-dimension vector $\alpha = [0.5, 0.6, L, 1.5]$; and setting subscripts of elements in the vector $\alpha$ to be $i = 1, 2, L, 11$; and determining optimal parameters $\omega_{opt}$, $\alpha_{opt}$ and $\beta_{opt}$ according to the following steps:
a) for $\alpha(i)$, setting subscripts of elements in the vector $\omega$ to be $j = 1, 2, L, n$, and establishing an objective function $T(\alpha(i), \omega(j)) = -(f_1 + f_2)$ for each element $\omega(j)$ of $\omega$;
wherein $f_1 = \text{sum}(fb_n)$, $f_2 = \text{sum}(-g)$, sum(g) represents a summation operation;
finding out $\beta$, which maximizes the value of objective function $T(\alpha(i), \omega(j))$, by using a one-dimension grid search method; storing $\beta$ into $\beta(j)$ of a one-dimensional vector $\beta$, and storing the value of the objective function into $T(j)$ of a one-dimension vector T;
b) finding out a maximum value T(maxid) of T, and finding out $\omega$(maxid) and $\beta$(maxid) at a location of subscript (maxid); and storing T(maxid), $\omega$(maxid), $\alpha(i)$ and $\beta$(maxid) into an i-th row of a two-dimension vector $\Omega$ with eleven rows and four columns;
c) setting $i = i+1$, if $i > 12$, performing step d), otherwise repeating step a) and step b) again;
d) finding out a maximum value in a first column of $\Omega$ to obtain last three values in a row corresponding to a subscript of the maximum value in the first column of $\Omega$, wherein the obtained last three values are the optimal frequency parameter $\omega_{opt}$ and the optimal adjustment parameters $\alpha_{opt}$ and $\beta_{opt}$, respectively;
in the objective function, setting $fb_n$ as a normalization of the fluid mobility interface curve fb, and calculating fb according to $$fb = \left[\frac{\partial SP}{\partial \omega(i)}\right]^2;$$

wherein SP is energy of instantaneous amplitude spectrum;
calculating SP according to $$SP = [\text{real}(S)]^2 + [\text{imag}(S)]^2;$$

wherein S is instantaneous amplitude spectrum, and is calculated according to $$S = ift\left[X \times \exp\left(-\frac{2\pi^2 f^2}{\alpha(i)\omega(j)^{2\beta}}\right)\right];$$

in the objective function, calculating g according to $g = fb_n g I_G$;
wherein the symbol g represents a Hadamard product operation;
determining a threshold a according to characteristics of input seismic data and logging information, and calculating $I_G$ according to $$\begin{cases} I_G(I_G < a) = 0 \\ I_G(I_G \geq a) = 1 \end{cases} \text{ or } \begin{cases} I_G(I_G \leq a) = 1 \\ I_G(I_G > a) = 0 \end{cases};$$

(3) normalizing the optimal fluid mobility interface curve FB to obtain $FB_n$, and standardizing x(t) to obtain $x_z(t)$;
(4) determining an upper boundary point set and a lower boundary point set of a gas-bearing reservoir according to extrema on the curve $x_z(t)$ and $FB_n$, and then determining indication results of the gas-bearing reservoir by using the upper boundary point set and the lower boundary point set according to the following steps:
a) determining other threshold b according to information about gas saturation in the logging information, picking up extrema bigger than the threshold b on the curve $FB_n$; and forming a contrast point set CP through index numbers of these extrema on the curve $FB_n$;
b) standardizing the x(t) to obtain $x_z(t)$, and picking up extrema on the $x_z(t)$; and forming an information point set I through index numbers of these extrema on the curve $x_z(t)$;
c) matching the information point set I with the contrast point set CP to form a candidate point set CA;
d) selecting a maximum point on the curve $FB_n$, finding out a reference point corresponding to an index number of the maximum point from the candidate point set CA and taking the reference point as a boundary to divide CA into an upper candidate point set $CA_L$ and a lower candidate point set $CA_B$, sorting points in the upper candidate point set $CA_L$ in descending order, and sorting points in the lower candidate point set $CA_B$ in ascending order;
e) for a point in the upper candidate point set $CA_L$ or in the lower candidate point set $CA_B$, if its corresponding value in $x_z(t)$ is smaller than an average of $x_z(t)$, putting the point in the $CA_L$ or in the $CA_B$ into the upper boundary point set UB; otherwise if its corresponding value in $x_z(t)$ is equal or bigger than the average of $x_z(t)$, putting the point in the $CA_L$ or in the $CA_B$ into the lower boundary point set LB; wherein there is an one-to-one match between the upper boundary point set UB and the lower boundary point set LB;
f) calculating the normalized gas-bearing reservoir indication GI of the input seismic record according to $$GI(j) = \begin{cases} 1, & UB(i) \leq j \leq LB(i) \\ 0, & \text{others} \end{cases};$$

wherein j is a subscript of an element in GI, and i is a subscript of an element in UB and LB;

g) performing inverse proportional transformation on GI to obtain the gas-bearing reservoir indication result of the input seismic record;

(5) repeating steps (1) to (4) until all the seismic records in the input 3D seismic data set are completely processed to obtain the gas-bearing reservoir indication results of the whole 3D seismic data set.

2. The method of claim 1, wherein in the use of the logging information as constraints, a distribution range of the gas-bearing reservoir is indirectly characterized by determining upper and lower boundaries of the gas-bearing reservoir, and optimal calculation parameters are automatically determined according to the characteristics of the input data.

3. The method of claim 1, wherein a plurality of wells are used as constraints to obtain a plurality of sets of the optimal frequency $\omega_{opt}$, and the optimal adjustment parameters $\alpha_{opt}$ and $\beta_{opt}$, and each set of the optimal parameters is used to calculate the gas-bearing reservoir indication result of the input seismic data set, and the respective calculation results are superimposed to obtain a more accurate result.

* * * * *